US007983923B1

(12) United States Patent
Schlaak et al.

(10) Patent No.: US 7,983,923 B1
(45) Date of Patent: Jul. 19, 2011

(54) COLLABORATIVE MANAGEMENT OF DELIVERY SCHEDULES

(75) Inventors: Peter Schlaak, Kronshagen (DE); Michael Krenbauer, Zuzenhausen (DE); Martin Preiss, Karlsruhe (DE); Edgar Wicht, Frensdorf (DE)

(73) Assignee: SAP AG, Walldorf (DE)

( * ) Notice: Subject to any disclaimer, the term of this patent is extended or adjusted under 35 U.S.C. 154(b) by 1871 days.

(21) Appl. No.: 10/611,319

(22) Filed: Jul. 1, 2003

Related U.S. Application Data

(60) Provisional application No. 60/395,245, filed on Jul. 10, 2002.

(51) Int. Cl.
*G06Q 10/00* (2006.01)
*G07B 17/00* (2006.01)

(52) U.S. Cl. .............................................. 705/1; 705/26

(58) Field of Classification Search ................... 705/26, 705/27, 28, 1
See application file for complete search history.

(56) References Cited

U.S. PATENT DOCUMENTS

| 4,937,743 | A | | 6/1990 | Rassman et al. |
|---|---|---|---|---|
| H1743 | H | | 8/1998 | Graves et al. |
| 6,085,170 | A | * | 7/2000 | Tsukuda .......................... 705/8 |
| 2002/0042735 | A1 | | 4/2002 | Narahara et al. |
| 2002/0099590 | A1 | | 7/2002 | Abate et al. |
| 2002/0143605 | A1 | * | 10/2002 | Holland et al. ................. 705/10 |
| 2002/0165804 | A1 | | 11/2002 | Beebe et al. |
| 2003/0055715 | A1 | | 3/2003 | Spence |
| 2003/0074377 | A1 | | 4/2003 | Gupta et al. |
| 2003/0109950 | A1 | | 6/2003 | Andrade, Jr. et al. |
| 2003/0167238 | A1 | | 9/2003 | Zeif |
| 2003/0200150 | A1 | | 10/2003 | Westcott et al. |

FOREIGN PATENT DOCUMENTS

JP 01133178 12/1990

OTHER PUBLICATIONS

IBM Technical Disclosure Bulletin, "Real-Time Interactive Tracking and Control System," Nov. 1990, Delphion.com, pp. 61-62.
IBM Technical Disclosure Bulletin, Computer-Aided Process Planning, Apr. 1994, Delphion.com, pp. 605-608.

* cited by examiner

*Primary Examiner* — Matthew S Gart
*Assistant Examiner* — Garcia Ade
(74) *Attorney, Agent, or Firm* — Blakely Sokoloff Taylor & Zafman LLP

(57) ABSTRACT

A method, performed on a computer of supplier, is used in managing a supply chain with multiple customers. The method includes receiving a new delivery schedule from a customer, determining a deviation between the new delivery schedule and a confirmed delivery schedule from the customer, and determining if the new delivery schedule is eligible for further consideration based on the deviation. If the new delivery schedule is eligible for further consideration, the method also includes generating a schedule of production resources and inventory that satisfies at least some requirements of the new delivery schedule, and confirming to the customer that the supplier accepts the new delivery schedule.

30 Claims, 8 Drawing Sheets

COLLABORATIVE MANAGEMENT OF DELIVERY SCHEDULES

CROSS-REFERENCE TO RELATED APPLICATION

This application claims priority to U.S. Provisional Application No. 60/395,245, filed on Jul. 10, 2002, the contents of which are hereby incorporated by reference into this application as if set forth herein in full.

TECHNICAL FIELD

This application relates generally to handling incoming customer delivery schedules in a supply chain.

BACKGROUND

Supply chain management refers, generally, to managing commerce (e.g., product shipments) between a manufacturer, various intermediaries, such as distribution centers, wholesalers and the like, and customers.

Standard supply chain manufacturing business-to-business transactions are automated using software on the customer side and supplier side. In a standard transaction, the customer releases, to the supplier, long-term forecasts of delivery dates and quantities of product that are within the scope of existing contracts. The customer also releases new or modified short-term delivery date and product quantity requirements that are within the scope of existing contracts.

Upon receiving the requirements, the supplier's system adds new or modified long-term and short-term requirements to its due delivery schedule for the supplier's customers and products. The supplier's system then schedules non-committed production time of resources and examines its inventory to meet the new delivery requirements.

In many manufacturing enterprises, software performs the scheduling due to the complexity of the production requirements and resources. Typically, this involves two people: one person to run the production scheduling software with new delivery schedules and another person to negotiate with the customer when due dates cannot be met. The output of the scheduling is an updated master production schedule.

Next, the supplier's manufacturing resource planner (MRP) software generates new detailed production requirements from the updated master production schedule. After the production requirements are generated, the MRP software allocates and dispatches production resources to manufacture the products according to the production requirements. The finished products are sent to the customer along with advanced shipping notifications (ASN).

A problem with standard transactions is that two or more people (on the supplier side) are kept busy controlling the production scheduling software and negotiating with the customer. By way of example, the production scheduling software may report to the supplier that its newly created schedule will not completely satisfy a customer's new requirements. In this case, a person at the supplier communicates the problem to the customer and negotiates either to relax the customer's requirements or to cancel orders. This problem is particularly important in certain industries where the supplier has the power to propose a schedule that deviates from the customer's preferred delivery schedule.

The supplier's people are also kept busy determining when a new delivery schedule from the customer is eligible for consideration by the supplier and/or if the deviations of the new schedule from a most recently confirmed delivery schedule are sufficiently substantial and abrupt to indicate problems in a communication with the customer.

SUMMARY

In general, in one aspect, the invention is directed to a method, performed on a computer of supplier, which is used in managing a supply chain with multiple customers. The method includes receiving a new delivery schedule from a customer, determining a deviation between the new delivery schedule and a confirmed delivery schedule from the customer, and determining if the new delivery schedule is eligible for further consideration based on the deviation. If the new delivery schedule is eligible for further consideration, the method also includes generating a schedule of production resources and inventory that satisfies at least some requirements of the new delivery schedule, and confirming to the customer that the supplier accepts the new delivery schedule. This aspect of the invention may also include one or more of the following features.

Generating the schedule may include updating an existing schedule of production resources and/or creating a new schedule of production resources. Determining the deviation may include comparing items from the new delivery schedule to items from the confirmed delivery schedule. The items may include quantities of goods to be delivered at specified dates. The deviation may be indicative of an error if the deviation exceeds a predetermined tolerance.

The method may also include prompting a user for input if the deviation exceeds the predetermined tolerance. Determining if the new delivery schedule is eligible for further consideration may be based, at least in part, on the user input. The new delivery schedule may be a forecast of delivery requirements, such as a long-term forecast. The method may include allocating resources based on the schedule of production resources.

In other aspects, the invention is directed to an apparatus and machine-readable medium that are used in performing the foregoing method.

Other features and advantages of the invention will become apparent from the following description, including the claims and drawings.

DESCRIPTION OF THE DRAWINGS

FIG. 6 is a GUI for use by a supplier, which indicates that the supplier's currently confirmed schedule deviates from a customer's delivery schedule.

FIG. 8 is a GUI for use by a supplier, which shows results of rescheduling production to reduce the deviation between a requested delivery schedule and the most recently confirmed delivery schedule of FIG. 6.

Like reference symbols in different figures indicate like elements.

DETAILED DESCRIPTION

Figure 1:
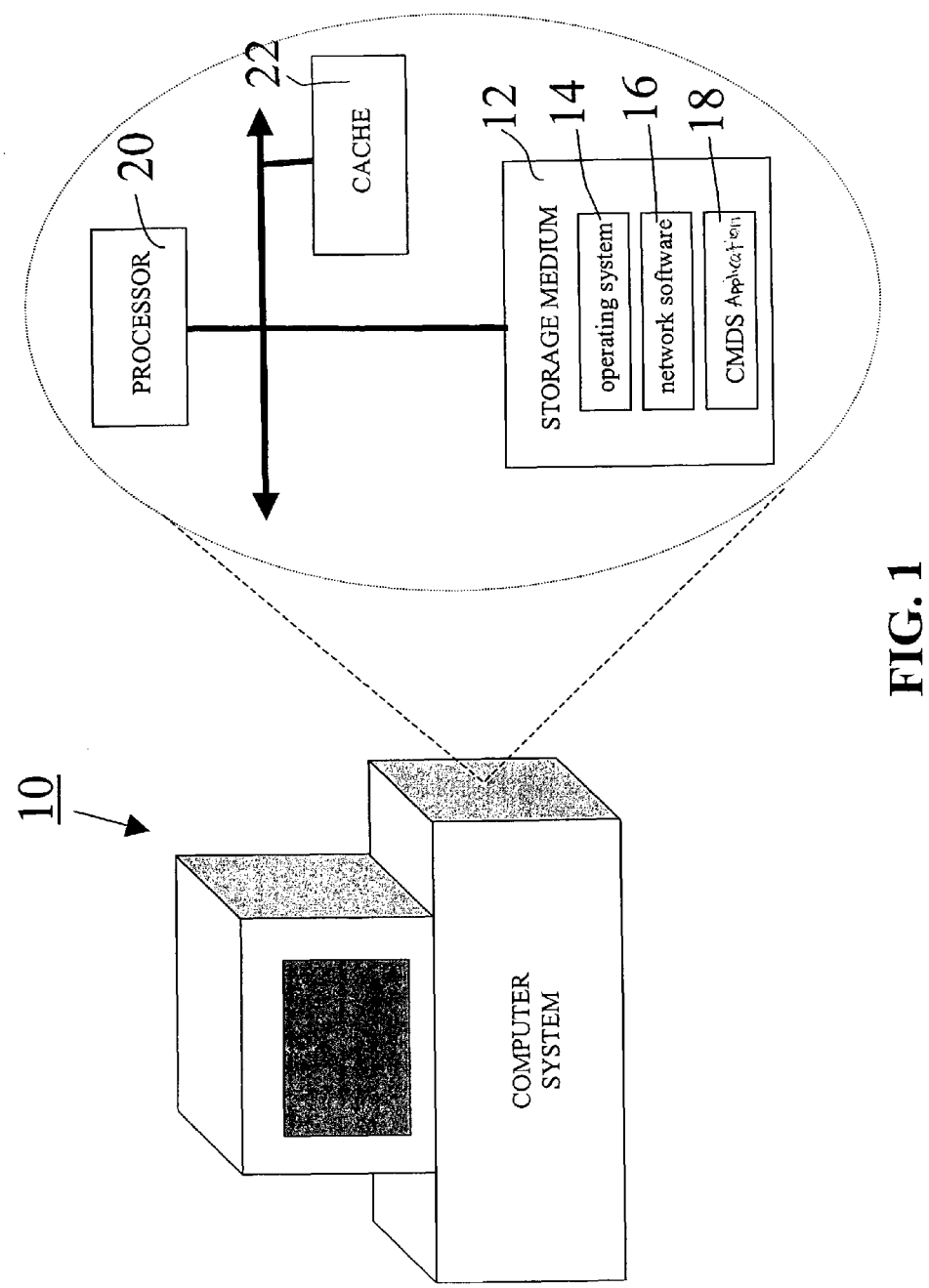
FIG. 1 is a block diagram of a computer that contains software used by a manufacturing supplier to handle incoming customer delivery schedules in a supply chain.

FIG. 1 shows a computer system 10. Computer system 10 contains a storage medium 12 that stores software (i.e., executable instructions), such as operating system software 14 and network software 16 for communicating over a network. Storage medium 12 also stores other software, including, but not limited to, collaborative management of delivery schedules (CMDS) application 18. In this embodiment, processor 20 executes CMDS application 18 to perform the CMDS process described below. CMDS application 18 contains various software routines for use by a manufacturing supplier to handle incoming delivery schedules in a supply chain.

Figure 2:
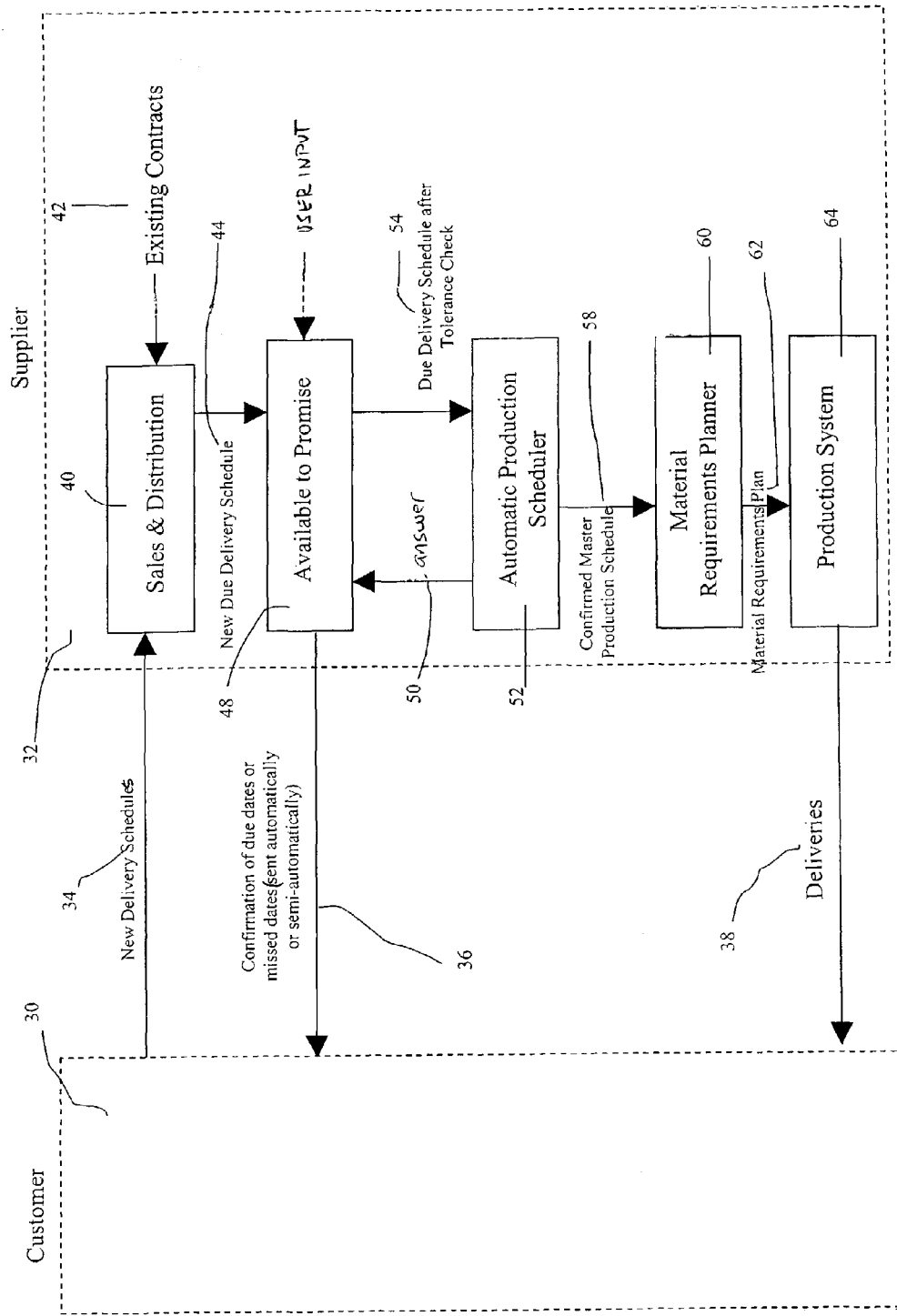
FIG. 2 is a block diagram of an architecture that implements a process used by a manufacturing supplier to handle incoming customer delivery schedules in a supply chain.
Figure 3:
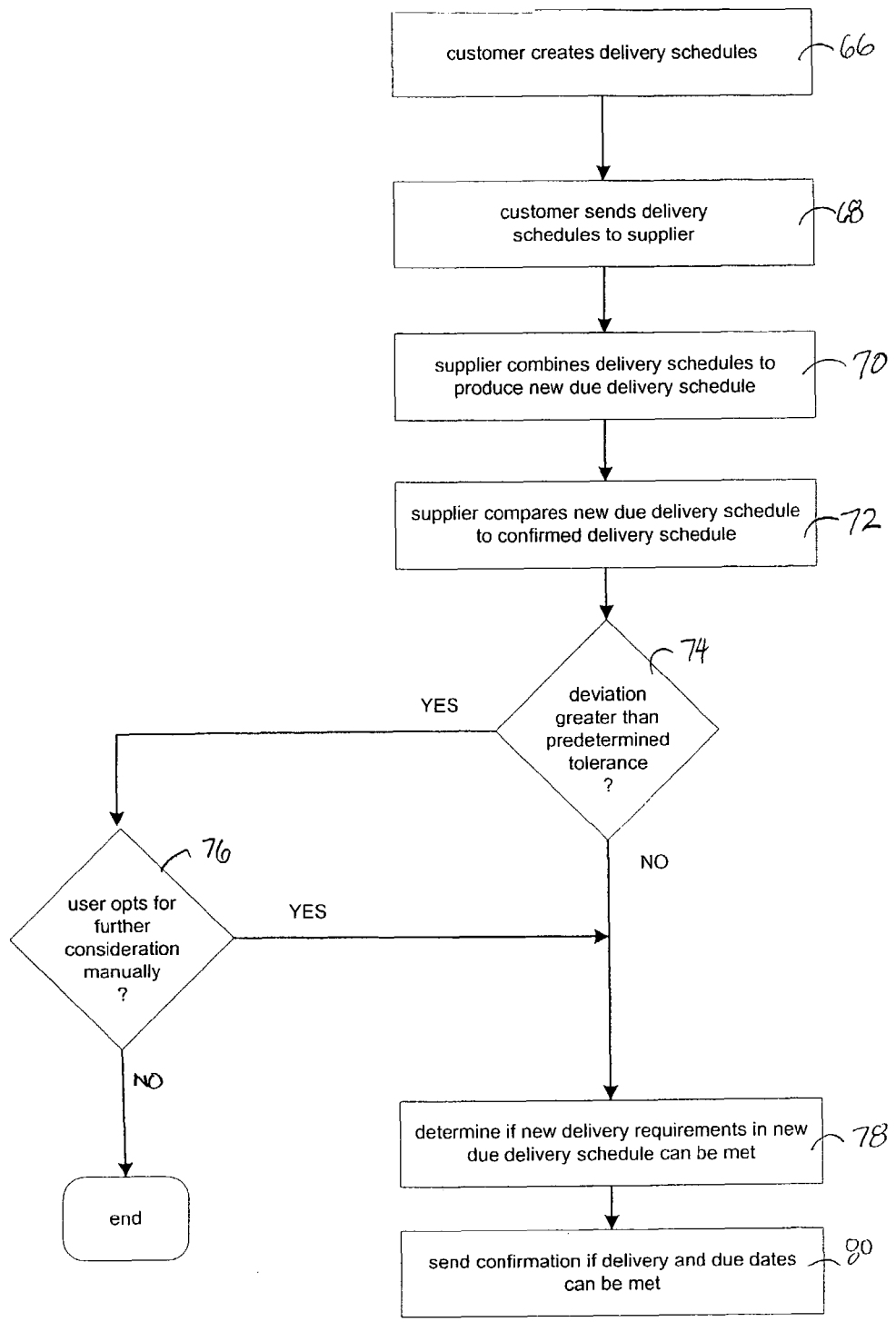
FIG. 3 is a flowchart showing a process used by a manufacturing supplier to handle incoming customer delivery schedules in a supply chain.

FIG. 2 shows a block diagram, which includes a block diagram of software modules on the supplier's side that implement the CMDS process. FIG. 3 is a flowchart of the CMDS process implemented by the software modules of FIG. 3.

The CMDS process improves the interaction between a customer 30 and a manufacturing supplier 32. Referring to FIGS. 2 and 3, customer 30 creates (66) new delivery schedules 34. These new delivery schedules 34 may be long-term forecasts designed to assists supplier long-term planning efforts. The delivery schedules 34 may also include short-term requirements. Customer 30 then sends (68) new delivery schedules 34 to sales & distribution block 40.

Sales & distribution block 40 combines (70) the new (short-term and long) delivery schedules for a given customer into a new due delivery schedule 44. Sales & distribution block 40 also checks the new delivery schedules 34 for compatibility with existing contractual arrangements 42. The resulting new due delivery schedule 44 is passed to the available-to-promise (ATP) block 48.

ATP block 48 can be configured to run automatically or semi-automatically (i.e., under the control of a user). ATP block 48 compares (72) new due delivery schedule 44 to a most recently confirmed delivery schedule for customer 30. If the two are the same, a confirmation may be sent to the customer. If the two are not the same, processing proceeds as follows.

ATP block 48 determines (74) if a deviation between the new due delivery schedule 44 and the most recently confirmed delivery schedule is less than a predetermined tolerance. The tolerance may be a percentage of product quantity to be delivered at a given date, and may be set by a user.

If the deviation is less than the predetermined tolerance, then the new delivery schedule is automatically eligible for further consideration provided the new due delivery schedule contains no other errors. A schedule may not be eligible for further consideration if deviations from the most recently confirmed delivery schedule are sufficiently substantial to indicate problems in a communication with the customer. If the new delivery schedule is eligible for further consideration, the CMDS process proceeds.

If the deviation between the new due delivery schedule 44 and the most recently confirmed delivery schedule is greater than the predetermined tolerance (74), then ATP block 48 asks the user to make a manual decision (76) about whether the new delivery schedule is eligible for further consideration. If the user opts for further consideration, the CMDS process proceed as described below; otherwise it ends.

At this point in the CMDS process, supplier 32 has an existing production schedule with delivery dates that are confirmed by its customers. This production schedule specifies when production resources are working and on what products the production resources are working. This production schedule corresponds to a confirmed master production schedule 58 and/or a material requirements plan 62.

Given the existing production schedule, ATP component 48 determines (78) if the new delivery requirements in new due delivery schedule 44 can be met by the supplier without violating existing delivery commitments. This is done by passing, to the supplier's automatic production scheduler 52, new due delivery schedule 44. New due delivery schedule 44 thus becomes a proposed schedule to scheduler 52.

Automatic Production Scheduler 52 incorporates proposed schedule 54 into the master schedule by scheduling only available time of production resources to meet the new delivery requirements, or by rescheduling all of the time (including previously-committed time) of the production resources so that existing confirmed delivery due dates and quantity commitments can be kept. Whichever option is selected, automatic production scheduler 52 responds to ATP block 48's proposed schedule 54 with an answer 50. Answer 50 indicates whether the delivery due dates and quantities in the proposed schedule 54 can be met.

In automatic mode, if delivery due dates and quantities can be met, then an automatic confirmation of the new delivery schedule 34 is sent (80) to customer 30. The proposed production schedule thus becomes the confirmed master production schedule 58 (or updates from the proposed production schedule are incorporated into the master production schedule). If delivery due dates and quantities cannot be completely met, then an automatic confirmation of the supplier's new delivery schedule that only partially meets the due dates and quantities is sent (80) to the customer 30. In this case, customer 30 can modify the due dates and create a new delivery schedule that matches the supplier's confirmed schedule, or cancel the order.

In semi-automatic mode, the user 46 gives final approval to the new production schedule before the customer 30 is notified and before the confirmed master production schedule 58 is updated.

After the confirmed master production schedule 58 is updated, material requirements planner 60 regenerates material requirements plan 62 and begins dispatching production resources and subassemblies according to this plan 62. Production system 64 responds to plan 62 and makes deliveries 38 on time to customer 30.

A GUI on the supplier's computer enables the user to proceed through the steps illustrated in FIG. 3. The GUI provides the following functions:

(1) displaying incoming new delivery requests from different customers;
(2) indicating to a user whether or not a new delivery request appears to be without error (eligible for consideration by supplier);
(3) enabling a user to choose between automatically, or upon request, scheduling or rescheduling production to satisfy incoming new release schedules from the customer;
(4) enabling the user to view and accept proposed scheduling or rescheduling of production resources to satisfy a latest release schedule from the customer; and (5) enabling the user to choose whether to automatically regenerate production requirements based on proposed scheduling or rescheduling of production resources.

Figure 4:
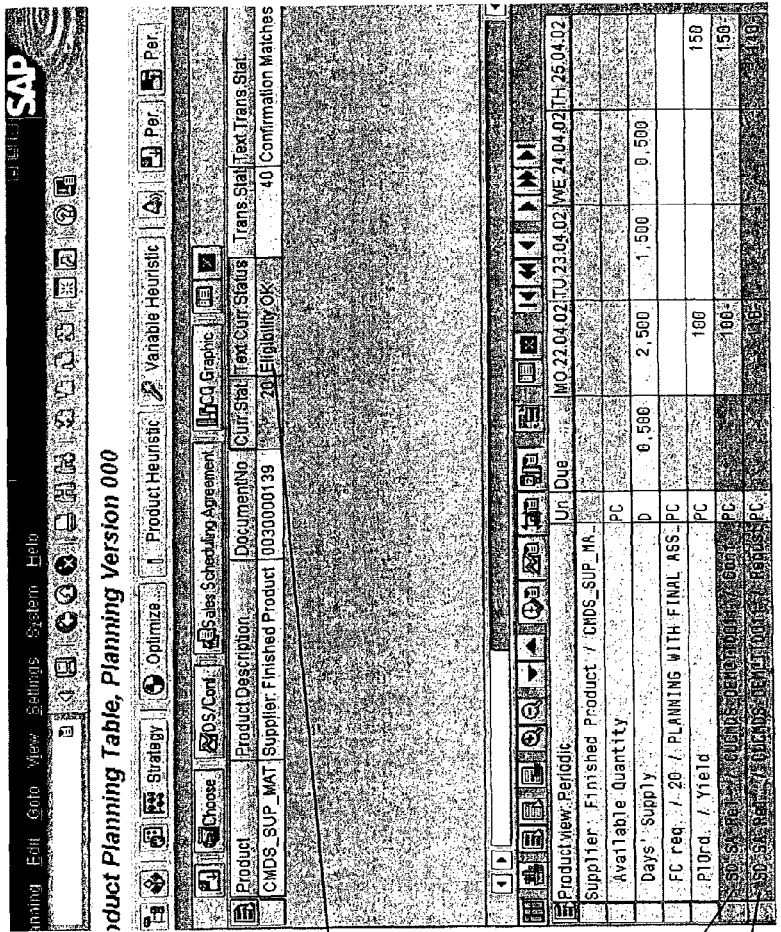
FIG. 4 is a graphical user interface (GUI) for a use by a supplier in determining if a received delivery schedule is eligible for consideration.

One embodiment of the GUI is illustrated in FIGS. 4 to 8. In FIG. 4 (window 118), line 104 is the latest confirmed delivery request from customer "OEM", while line 105 is the most recent delivery request from the customer "OEM". In this case, the most recent delivery request 105 is for "110" units to be delivered by Apr. 22, 2002 and "140" units to be delivered by Apr. 25, 2002. The latest confirmed delivery request 104 from "OEM" is for "100" units to be delivered by Apr. 22, 2002 and "150" units to be delivered by Apr. 25, 2002. Box 119 indicates to the user that this delivery request 105 is eligible for consideration by the supplier with the message "Eligibility OK". Delivery request 104 is eligible because the delivery due dates are identical to the latest confirmed dates and the deviation between the quantities of "110" and "140" is below the predetermined tolerance.

Figure 5:
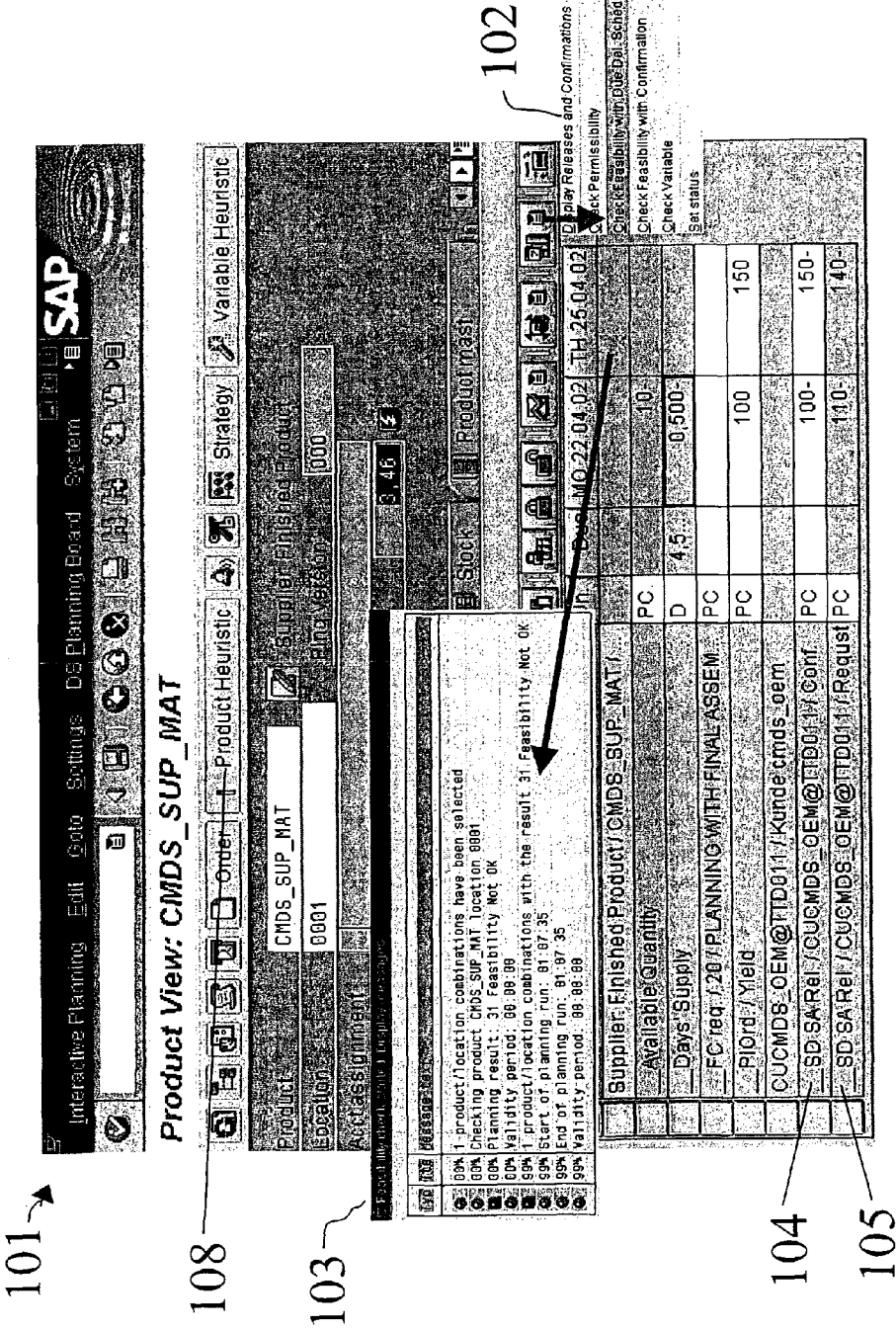
FIG. 5 is a GUI for use by a supplier to check the feasibility of a received delivery schedule from a customer.

Via FIG. 5 (window 101), a user may request a feasibility check of a schedule change by pulling down submenu 102 and selecting "Check Feasibility with Due Del. Schedule". This action checks whether a new delivery request can be satisfied based on current inventory and without modifying any currently scheduled production time on resources. In this example, sub-window 103 informs the user that the new delivery request cannot be satisfied within the constraints of the currently confirmed delivery schedule.

Here, the user decides not to reschedule production. The customer "OEM" receives confirmation that there is a deviation between the delivery request and the supplier's capabilities. The user may click on the "Product Heuristic" button 108 to ask the scheduler if the new delivery request can be satisfied by rescheduling existing production resources.

Figure 6:
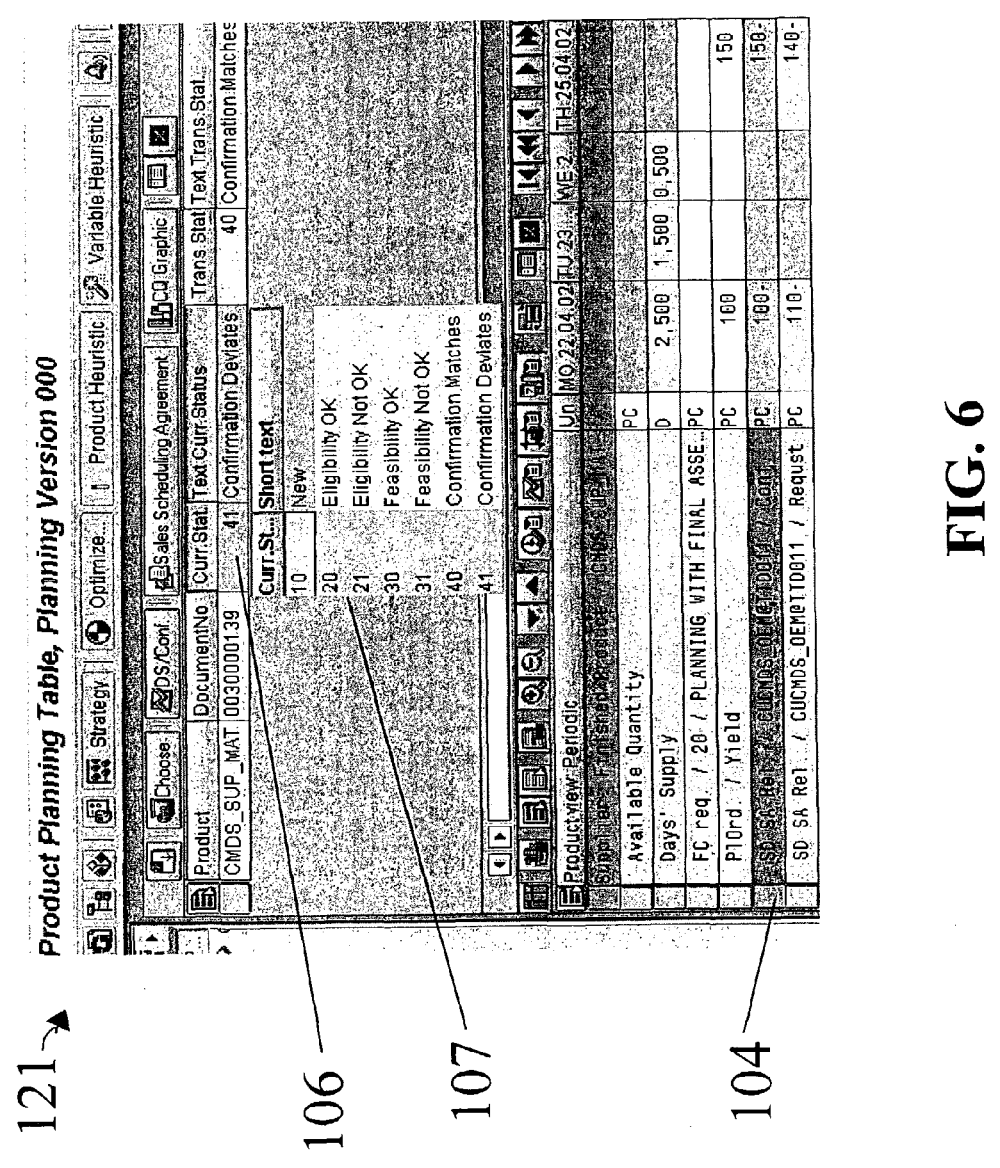

FIG. 6 shows the updated GUI window 121, in which a confirmation (with deviation) has been sent to the customer. Field 106 shows that the current status of the delivery schedule is #41 ("Confirmation Deviates"). Sub-screen 107 displays all of the possible values for the current status.

Figure 7:
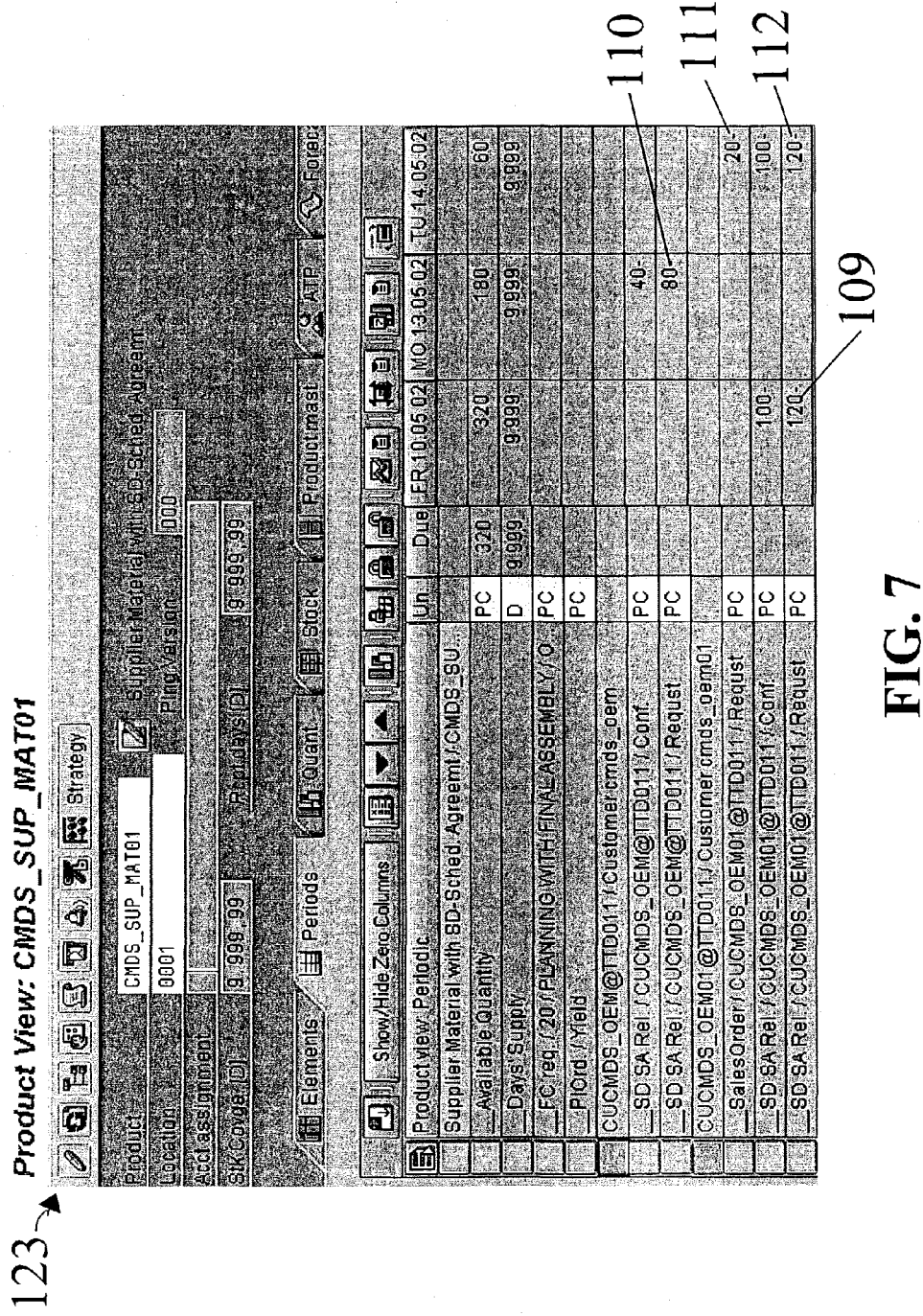
FIG. 7 is a GUI for use by a supplier that shows a requested delivery schedule from two customers and a most recently confirmed delivery schedule from the customers.
Figure 8:
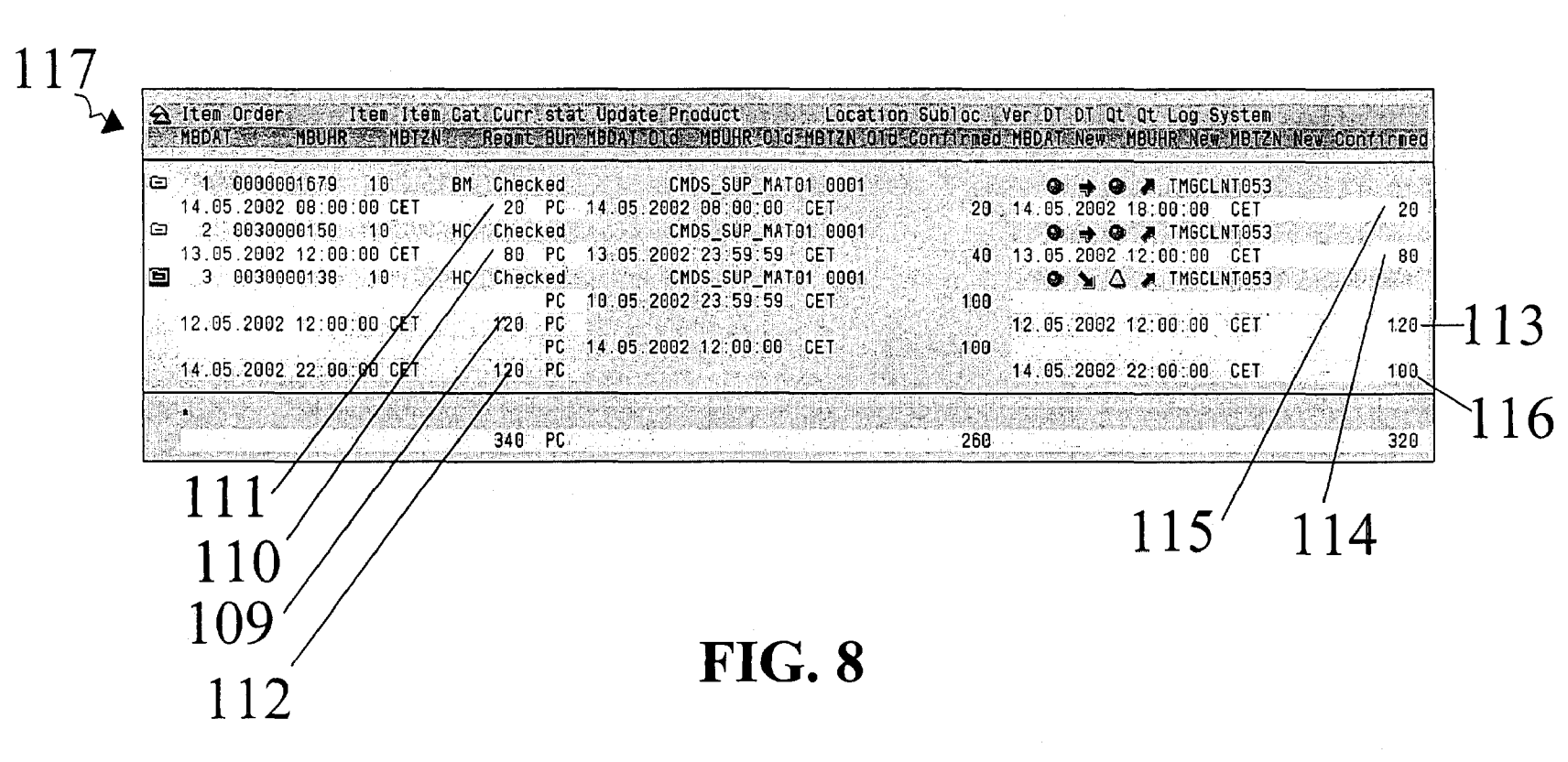

FIGS. 7 and 8 show the GUI in the situation where the user asks the system to reschedule production to see if new delivery requests can be satisfied. After this check, the GUI informs the user that most of the new delivery requirements can be satisfied. FIG. 7 shows window 123 with four new delivery requests. Delivery request 109 from customer "OEM01" is a modification of a confirmed delivery of 100 units on May 10, 2002. The modification increases this delivery to "120" units. Delivery request 110 from customer "OEM" is a modification of a confirmed delivery of "40" units on May 13, 2002. The modification increases this delivery to "80" units. Delivery request 110 from customer "OEM" is a modification of a confirmed delivery of "40" units on May 13, 2002. The modification increases this delivery to "80" units. Delivery request 111 from customer "OEM01" is a new delivery request for "20" units on May 14, 2002. Delivery request 112 from customer "OEM01" is a modification of a confirmed delivery of "100" units on May 14, 2002. The modification increases this delivery to "120" units.

After the system has rescheduled to attempt to satisfy these new delivery requests, the system displays window 117 (shown in FIG. 8) to the user.

Window 117 informs the user that three out of the four new delivery requests can be satisfied and confirmed to the customers. Specifically, new delivery request 109 is satisfied according to box 113, which informs the user that 120 units can be delivered on time. New delivery request 110 is satisfied according to box 114, which informs the user that 80 units can be delivered on time. New delivery request 111 is satisfied according to box 115 that informs the user that 20 units can be delivered on time. New delivery request 112 cannot be satisfied according to box 116, which informs the user that only 100 units can be delivered on time. Subsequently, confirmation of this new schedule that partially deviates from the customer's new delivery schedule may be sent to the customer.

Although a computer is shown in FIG. 1, the processes described herein, including the CMDS process, are not limited to use with the hardware and software of FIG. 1. The processes may find applicability in any computing or processing environment. The processes may be implemented in hardware, software, or a combination thereof.

The processes described herein may be implemented using one or more computer programs executing on one or more programmable computers or other machines that each includes a processor and a storage medium that is readable by the processor (including, but not limited to, volatile and non-volatile memory and/or storage components).

Each such program may be implemented in a high-level procedural or object-oriented programming language to communicate with a computer system. However, the programs can be implemented in assembly or machine language. The language may be a compiled or an interpreted language.

Each computer program may be stored on a storage medium or other article of manufacture (e.g., CD-ROM, hard disk, or magnetic diskette) that is readable by a general or special purpose programmable computer for configuring and operating the computer when the storage medium or device is read by the computer to perform the processes'described herein. The processes may also be implemented as one or more machine-readable storage media, configured with one or more computer program(s), where, upon execution, instructions in the computer program(s) cause one or more machines to operate in accordance with the processes described herein.

Other embodiments not described herein are also within the scope of the following claims.

What is claimed is:

1. A method, performed on a computer of supplier, for use in managing a supply chain with multiple customers, the method comprising:
   receiving, in a computer, a new delivery schedule from a customer;
   determining, in a computer, a deviation between the new delivery schedule and a confirmed delivery schedule from the customer; and
   determining if the new delivery schedule is eligible for further consideration based on the deviation;
   wherein, if the new delivery schedule is eligible for further consideration, the method further comprises:
   generating, in a computer, a schedule of production resources and inventory that satisfies at least some requirements of the new delivery schedule; and
   confirming to the customer that the supplier accepts the new delivery schedule.

2. The method of claim 1, wherein generating comprises updating an existing schedule of production resources.

3. The method of claim 1, wherein generating comprises creating a new schedule of production resources.

4. The method of claim 1, wherein determining the deviation comprises comparing items from the new delivery schedule to items from the confirmed delivery schedule.

5. The method of claim 4, wherein the items comprise quantities of goods to be delivered at specified dates.

6. The method of claim 1, wherein the deviation is indicative of an error if the deviation exceeds a predetermined tolerance.

7. The method of claim 6, further comprising:
prompting a user for input it the deviation exceeds the predetermined tolerance;
wherein determining if the new delivery schedule is eligible for further consideration is based, at least in part, on the user input.

8. The method of claim 1, wherein the new delivery schedule comprises a forecast of delivery requirements.

9. The method of claim 8, wherein the forecast comprises a long-term forecast.

10. The method of claim 1, further comprising allocating resources based on the schedule of production resources.

11. A machine-readable medium that stores executable instructions for use in managing a supply chain with multiple customers, the instructions causing a machine to:
receive, in a computer, a new delivery schedule from a customer;
determine, in a computer, a deviation between the new delivery schedule and a confirmed delivery schedule from the customer;
determine if the new delivery schedule is eligible for further consideration based on the deviation;
generate, in a computer, a schedule of production resources and inventory that satisfies at least some requirement of the new delivery schedule if the new delivery schedule is eligible for further consideration; and
confirm to the customer that the supplier accept~the new delivery schedule.

12. The machine-readable medium of claim 11, wherein generating comprises updating an existing schedule of production resources.

13. The machine-readable medium of claim 11, wherein generating comprises creating a new schedule of production resources.

14. The machine-readable medium of claim 11, wherein determining the deviation comprises comparing items from the new delivery schedule to items from the confirmed delivery schedule.

15. The machine-readable medium of claim 14, wherein the items comprise quantities of goods to be delivered at specified dates.

16. The machine-readable medium of claim 11, wherein the deviation is indicative of an error if the deviation exceeds predetermined tolerance.

17. The machine-readable medium of claim 16, further comprising instructions that cause the machine to:
prompt a user for input if the deviation exceeds the predetermined tolerance:
wherein determining if the new delivery schedule is eligible for further consideration is based, at least in part, on the user input.

18. The machine-readable medium of claim 11, wherein the new delivery schedule comprises a forecast of delivery requirements.

19. The machine-readable medium of claim 11, wherein the forecast comprises a long-term forecast.

20. The machine-readable medium of claim 11, further comprising instructions that cause the machine to allocate resources based on the schedule of production resources.

21. A apparatus for use in managing a supply chain with multiple customers, the apparatus comprising a processor that executes instructions to:
receive a new delivery schedule from a customers
determine a deviation between the new delivery schedule and a confirmed delivery schedule from the customer;
determine if the new delivery schedule is eligible for further consideration based on the deviation;
generate a schedule of production resources and inventory that satisfies at least some requirements of the new delivery schedule if the new delivery schedule is eligible for further consideration; and
confirm to the customer that the supplier accepts the new delivery schedule.

22. The apparatus or claim 21, wherein generating comprises updating an existing schedule of production resources.

23. The apparatus of claim 21, wherein generating comprises creating a new schedule of production resources.

24. The apparatus of claim 21, wherein determining the deviation comprises comparing items from the new delivery schedule to items from the confirmed delivery schedule.

25. The apparatus of claim 24, wherein the items comprise quantities of goods to be delivered at specified dates.

26. The apparatus of claim 21, wherein the deviation is indicative of an error if the deviation exceeds a predetermined tolerance.

27. The apparatus or claim 26, wherein the processor executes instructions to:
prompt a user for input if the deviation exceeds the predetermined tolerance;
wherein determining if the new delivery schedule is eligible for further consideration is based, at least in part, on the user input.

28. The apparatus of claim 21, wherein the new delivery schedule comprises a forecast of delivery requirements.

29. The apparatus of claim 28, wherein the forecast comprises a long-term forecast.

30. The apparatus of claim 21, wherein the processor executes instructions to allocate resources based on the schedule of production resources.

* * * * *

UNITED STATES PATENT AND TRADEMARK OFFICE
CERTIFICATE OF CORRECTION

PATENT NO. : 7,983,923 B1
APPLICATION NO. : 10/611319
DATED : July 19, 2011
INVENTOR(S) : Peter Schlaak et al.

Page 1 of 1

It is certified that error appears in the above-identified patent and that said Letters Patent is hereby corrected as shown below:

In the Claims:

Column 7, Claim 7, line 5, delete "it", and insert --if--.

Column 8, Claim 21, line 15, delete "customers" and insert --customer--.

Column 8, Claim 22, line 26, delete "or" and insert --of--.

Column 8, Claim 27, line 38, delete "or" and insert --of--.

Signed and Sealed this
Sixteenth Day of April, 2013

Teresa Stanek Rea
*Acting Director of the United States Patent and Trademark Office*